Figure 1:
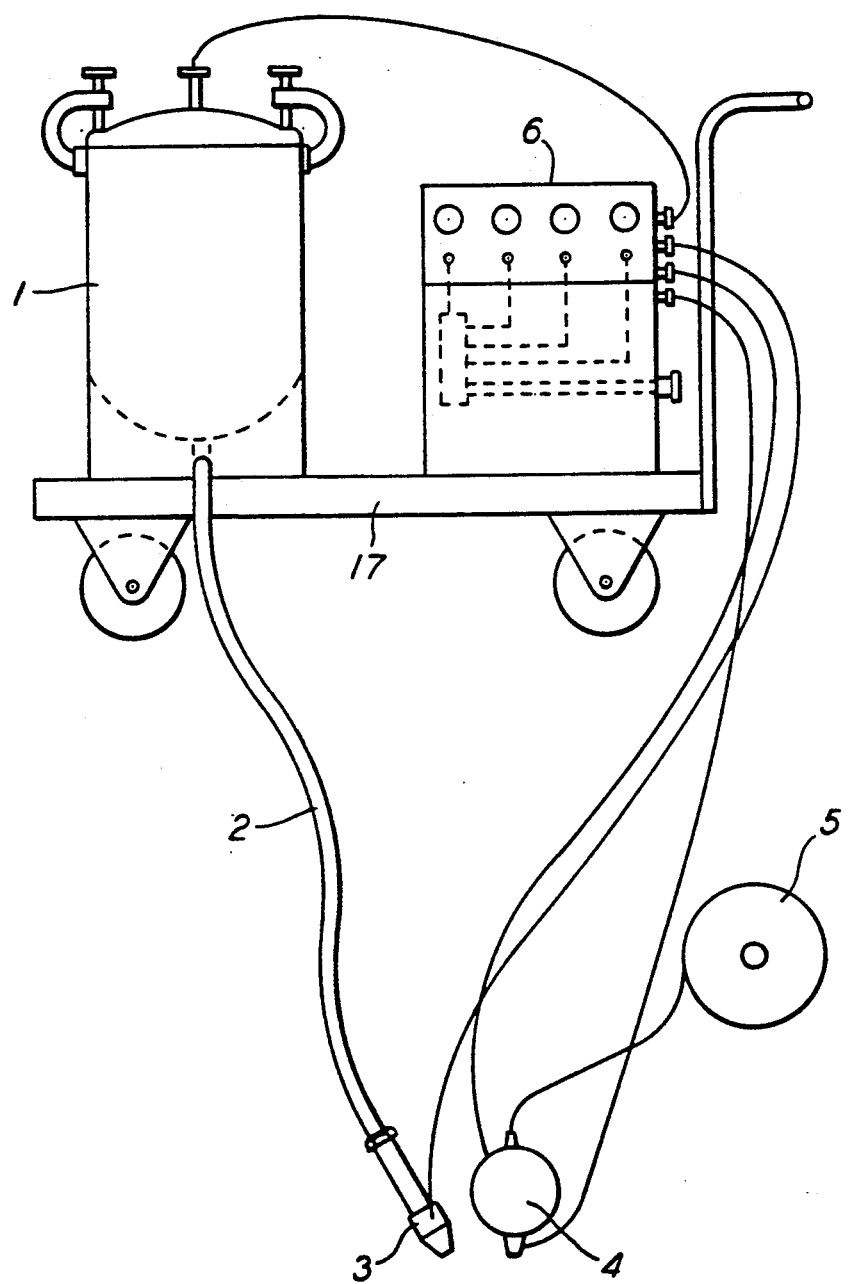

United States Patent [19]

Hawkins

[11] Patent Number: 5,100,474
[45] Date of Patent: Mar. 31, 1992

[54] GLASS FIBRE REINFORCED PLASTER COMPOSITION

[75] Inventor: Peter J. Hawkins, Hertfordshire, England

[73] Assignee: Panel Craft-Benncroft Limited, England

[21] Appl. No.: 571,593

[22] PCT Filed: Feb. 17, 1989

[86] PCT No.: PCT/GB89/00188
§ 371 Date: Aug. 16, 1990
§ 102(e) Date: Aug. 16, 1990

[87] PCT Pub. No.: WO89/07582
PCT Pub. Date: Aug. 24, 1989

[30] Foreign Application Priority Data

Feb. 18, 1988 [GB] United Kingdom ............... 8803807

[51] Int. Cl.$^5$ ............................................. C04B 14/42
[52] U.S. Cl. ........................................ 106/711; 156/42
[58] Field of Search ........................... 106/711; 156/42

[56] References Cited

U.S. PATENT DOCUMENTS

| | | | |
|---|---|---|---|
| 2,664,406 | 12/1953 | Armstrong | 106/711 |
| 2,871,134 | 1/1959 | Loechl | 106/711 |
| 2,970,127 | 1/1961 | Slayter et al. | 106/711 |
| 3,062,670 | 11/1962 | Marzocchi et al. | 106/711 |
| 4,233,368 | 11/1980 | Baehr et al. | 106/711 |

FOREIGN PATENT DOCUMENTS

| | | | |
|---|---|---|---|
| 717109 | 10/1954 | United Kingdom | 106/711 |
| 1519884 | 8/1978 | United Kingdom | 106/711 |
| 2020722 | 11/1979 | United Kingdom . | |

*Primary Examiner*—Mark L. Bell
*Assistant Examiner*—Anthony J. Green
*Attorney, Agent, or Firm*—Armstrong, Nikaido, Marmelstein, Kubovcik & Murray

[57] ABSTRACT

A glass fibre reinforced composition of a settable mix of plaster, a water-based phenol formaldehyde resin, an acid hardener and a reinforcement of glass fibres. A product of this composition can be produced by spraying the fluid mix and fibre component separately but simultaneously onto a surface.

17 Claims, 2 Drawing Sheets

GLASS FIBRE REINFORCED PLASTER COMPOSITION

This invention relates to a glass fibre reinforced plaster composition, methods of making the composition and to products made from the composition, comprising a glass-fibre reinforced plaster, a water-based phenolic resin, and additives to control the setting time of the composition.

In recent years there have been significant developments made in fire resistant, low smoke and toxic fume materials to satisfy a growing need for safe materials in public places and transport generally, e.g., aircraft industry, railways, underground and main line stations, BS 6853 1987 is now a British Standard Code of Practice for fire precautions in the design and construction of railway passenger rolling stock. In the last two years water-based phenolic resins have been developed for hand lay up methods of making glass-fibre reinforced plastics products, as the resin displays improved fire resistance and smoke emission compared with previously known resins.

According to one aspect of the present invention, there is provided a glass fibre-reinforced plaster composition comprising a settable fluid mix consisting of between 55% and 65% of a Gypsum plaster, between 20% and 30% by weight of mix of a water based phenol formaldehyde resin and between 3% and 5% by weight of mix of an acid hardener, and the mix also containing not less than 10% by weight of the mix of a fibre reinforcement.

The invention has the advantage that, by incorporating plaster with the phenolic resin, the resin content of the composition can be reduced, compared to the resin content of glass-fibre plastics products formed by the laying up technique, which results in a product which is less of a fire hazard and is also considerably cheaper to manufacture.

The invention has another advantage, in that the phenolic resin formulation contains 80% resin solids and 20% water. In the case of the resin/glass laminate glass-reinforced plastics material the 20% water retained after exothermy is driven off by evaporation usually in a drying chamber. As the water escapes from the hardening material pin holes are formed in the surface of the product which require filling with a wipe on/wipe off filler before application of a decorative surface coating. By incorporating plaster with the phenolic resin as in the preferred embodiment of the invention, the water contained in the phenolic resin plus added water is used to set the plaster and taken up by the process of hydrolysis. This occurs before exothermy of the resin and pin holing of the surface is prevented. The product cures more rapidly and does not require a heater chamber to complete the cure.

A preferred embodiment of the invention provides a glass-fibre reinforced plaster composition comprising a settable, fluid mix of between 55% and 65% of a plaster, between 20% and 30% by weight of mix of a water-based phenol formaldehyde resin, between 3% and 5% by weight of mix of an acid hardener, between 7% and 13% by weight of mix of water, and not less than 10% by weight of the mix of a glass fibre reinforcement.

In another aspect of the invention, the mix includes between 10% and 15% of a non combustible filler.

In yet another aspect of the invention, the mix includes between 10% and 20% of glass fibre reinforcement.

According to still other aspects of the invention as may be required for particular uses, the composition may include an acid hardening agent, a control agent based on calcium carbonate to control the Ph of the composition for pot life and setting time, and colouring agents.

In still another aspect of the invention, the mix may contain less than 15% water by weight of the mix and a water/plaster ratio of less than 25% by weight to provide a fluid workable mix to a consistency of thick cream suitable for hand lamination and hand-spray application.

In a preferred embodiment of the invention to provide a fire resistant material with low smoke and fume characteristics, a plaster reinforced composition comprises a mix which consists of 62.1% of gypsum plaster, 24.8% by weight of a water based phenolic resin, 4% acid hardener comprising of a blend of strong organic and mineral acids, 8.75% water, and up to 1% control additives based on calcium carbonate, the mix also includes between 10% and 20% by weight of the mix of a glass fibre reinforcement.

A composition produced in accordance with this invention and using the preferred formulation for laminated products with a spray applied decorative surface coating based on the Plastilac AE 245 coating system developed for high fire performance, by Trimite Limited, has been tested to the listed fire performance standards and codes of practice, the following certificates of compliance being available:

| | | |
|---|---|---|
| 1) | BS 476 Part 6 (Fire Propagation) | {Class '0' {Building |
| 2) | BS 476 Part 7 (Surface Spread of Flame) | {Regulations |

3) Airbus Industrie ATS 1000.001 issue 4 specification for smoke density and fume emission.
4) London Transport Research Laboratory LRT 3 m cube conditions (60 degree panel test) for smoke emission and temperature index.
5) Oxygen index text to ASTM D 2863-77.

A flat laminated sheet, using the preferred formulation, has the following mechanical properties:

| | | |
|---|---|---|
| Glass fibre content | (by weight) | 12–15% |
| Normal Density | (tonne/m$^3$) | 1.5–1.7 |
| Compressive strength | (N/mm$^2$) | 28–35 |
| Tensile strength (UTS) | (N/mm$^2$) | 36–38 |
| Bending strength (MOR) | (N/mm$^2$) | 55–60 |
| Impact strength UEAtc MOAT 43 1987 | | Category 1 |
| Bending elastic limit (LOP) | (N/mm$^2$) | 18–20 |
| Youngs modulus | (KN/mm$^2$) | 6–8 |
| Poissons ratio | | 0.15–0.20 |
| Interlaminar shear | (N/mm$^2$) | 3–5 |
| In plane shear | (N/mm$^2$) | 45–50 |

The invention also provides for three methods of production of flat sheet and moulded form products.

a) Premix, where the settable fluid mix has chopped glass fibres added at the mixing stage, the mix being poured or injected, into open or closed moulds. The preferred amount of chopped glass fibre being between 1.5% and 4% by weight.

b) Hand Laminated, where the settable fluid mix is used to laminate in flat sheet or moulded form, the glass fibre reinforcement preferred being "E" glass chopped strand mat to produce a laminate of between 3 mm and 6 mm thick.

c) Hand Spray Laminate, the invention also comprising a process of spraying the mix by a twin head gun apparatus for the preparation of a fibre reinforced plaster composition, comprising a settable fluid mix consisting of between 55% and 65% of a Gypsum plaster, between 20% and 30% by weight of mix of water based phenol formaldehyde resin and between 3% and 5% by weight of mix of an acid hardener, and between 7% and 13% by weight of mix of water and the mix also containing not less than 10% by weight of the mix of a fibre reinforcement.

An apparatus for carrying out the method of the invention includes a storage means for the fluid components of the mix, a supply means for the fibre reinforcement, a control means and means to deliver the fluid mix and the fibre reinforcement separately to a discharge means, the discharge means having means by which the fluid mix and the fibre reinforcement are combined and discharged simultaneously.

The remaining components of the composition are made up of relatively smaller percentages of hardeners, fillers and colouring pigments.

A preferred formulation of the product, which is suitable for the manufacture of moulded panels for external use, is as follows:

| | |
|---|---|
| "Crystacal Plaster R" | 62.20% |
| Water based phenolic resin | 24.80% |
| Acid Hardener | 4.00% |
| Water | 8.75% |
| Calcium Carbonate | 0.15% |
| Anti Foam Agent | 0.20% |
| | 100.00% |

It will be appreciated that the colour pigments may be varied or left out as required. To this settable fluid mix, the fibre reinforcement is added to produce the settable composition.

The invention also describes the process for producing a glass fibre reinforced product, the process comprising preparing a settable fluid mix as defined above, supplying the mix under pressure to a spraying unit, simultaneously spraying the fluid mix as defined above, simultaneously spraying the fluid mix and fibre reinforcement of a predetermined length and in a predetermined proportion to the quantity by weight of the fluid mix, onto a mould surface to build up a layer of material to a predetermined thickness and consolidating the surface of the layer of compaction before building up a successive layer of material.

In the handspray method, the product to be formed is a cladding panel which is formed of a settable fluid mix to which 10% by weight of glass fibres each approximately 25 mm in length is added. A suitable formulation for the settable fluid mix is as set about above, although it will be appreciated that variations may be made to the proportions listed depending on the requirements of the particular product being made and the particular type of finish and colour required. To the basic mix, fillers and pigments are added as appropriate, provided that the proportions of the plaster, phenolic resin are kept within the above defined limits.

The accompanying drawings show, in simplified form, two embodiments of an apparatus for carrying out the invention.

Figure 2:
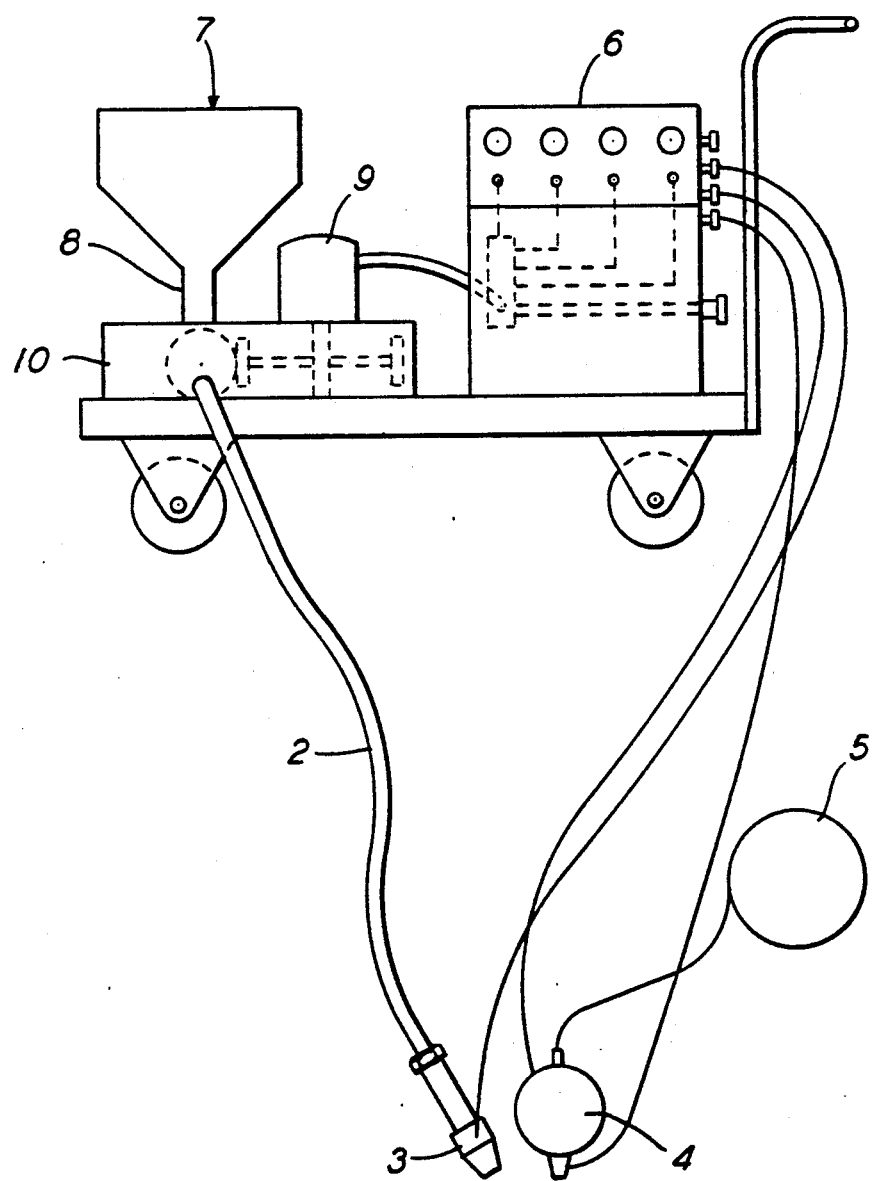

FIG. 1 is an elevational view showing an apparatus utilizing a pressurized storage container to hold the fluid mix, while FIG. 2 is identical to FIG. 1 except that a non-pressurized storage container is utilized from which the fluid mix must be pumped.

FIG. 1 shows a spraying apparatus having a pressurized storage container or pot 1 holding the fluid mix. The mix is in the form of a slurry which is settable and includes a chemical retardant to provide a pot life during which the slurry remains sufficiently fluid for spraying, for example 45 minutes. A hose 2 connects the container 1 to a spray head or gun 3, adapted to spray a predetermined quantity of the slurry, dependent on supply pressure and nozzle dimensions. At a typical pressure of 1.05 Kg/cm$^2$ and with a nozzle of 6 mm diameter, an output of approximately 5 to 6 Kg/minute is obtained.

The spray head 3 is part of a twin-head combination which also includes a combined fibre chopper and spray nozzle 4. The glass fibres to be sprayed from the nozzle 4 are fed from a reel or "cheese" 5 to the chopper, where they are cut into predetermined lengths, typically of 25 mm. A supply of compressed air is fed to the nozzle 4 from which the cut fibres are discharged.

The quantity of discharged fibre is also regulated by the compressed air pressure and the size of the nozzle 4. The apparatus includes a control system 6 which includes a compressor and the whole apparatus may be mounted on a wheeled chassis 17.

In the apparatus shown in FIG. 2, the fluid mix is contained in a hopper 7 fed by a pump 8, which is, for example a peristaltic pump, by means of a motor 9 driving through an oil bath 10.

Spraying is commenced by simultaneously spraying glass fibres and the fluid mix slurry at the desired rate and in the set proportions to combine the two materials on a mould surface; which, in this embodiment is a cladding panel to be used for example on a building or like structure. The composition is equally suitable for spraying into a mould to produce a shaped article. At the pressures and nozzles sizes stated, it has been found that a double pass of the spray gun builds up a layer of material approximately 2 mm thick. Spraying is then stopped and the sprayed material compacted by roller, typically a hand roller, to ensure complete encapsulation of the glass fibres and the removal of air pockets. After the layer has been rolled, a further layer is sprayed on the first layer. This process is repeated until the required thickness of the laminate has been achieved. The hardening process takes approximately 1.5 hours, after which the completed product can be removed from the mould.

It is within the ambit of the present invention that the first layer applied to the mould, which is intended to form the exterior surface of the end product, may be of a different composition, possibly omitting the glass fibres and containing, for example, particular colour pigments or crushed stone fillers, which is sprayed on to form the first layer prior to subsequently spraying the layers incorporated the glass fibre reinforcement. The precise type of reinforcement, colour and fillers, where present, will vary depending upon the appearance required for the end product and the physical requirements. The use of the polymerised plaster enables a much finer surface definition to be achieved and it is possible to achieve excellent representations of natural materials such as slate and York stone. The polymerised plaster provides a slurry with the consistency of thick cream which provides a high workability but is also capable of being spraying through and pressure pot without segregation of the ingredients. By spraying the material on in relatively thin layers of between 2 and 6 mm thickness, the strength of the material is enhanced since the rolling between the layers removes all trapped air and ensures that the fibres are firmly embedded in the slurry before the slurry sets.

Furthermore, by using the material of the present invention it has been found that it is possible to use a smaller proportion of the more expensive materials since it is no longer necessary to use anti-alkali glass material as is the case with glass reinforced cement. It has been found that a preferred proportion of the glass fibre content is between 10% by 12% by weight of the total mix; the composition typically sets sufficiently for de-moulding within about 90 minutes of casting, by which time the moisture content has fallen to about 20% of its original value. At ambient temperatures above 15° Centigrade the material will cure without the need for a drying chamber and normally curing will be complete within 24 hours of casting.

Typically, the resultant product will have a density in the range of $1.5-1.7 \times 10^3$ kg/m$^3$, depending on the glass fibre content and the presence or absence of fillers. Water absorption after 24 hours immersion was in the region of only 5% and the material was visibly unaffected by repeated freeze/thaw cycles. The air dried material showed a flexural strength of modulus of rupture of 55N/mm$^2$, while after two hours submersion this had fallen to 30N/mm$^2$, after the test sample had returned to its air-dried state, the original value was restored.

The material has displayed extremely good resistance to weathering effects and tests have shown that it is virtually fireproof and highly resistant to ignition.

It will be understood that the method of the present invention may be used to form products of many different shapes and thicknesses, not only such as flat cladding panels, but also shaped mouldings for interior or exterior use. Although the preferred embodiment utilises glass fibre reinforcement, other filamentary materials such as polypropylene may be used.

I claim:

1. A glass fibre reinforced plaster composition comprising a settable fluid mix consisting by weight of the mix, of between 55% and 65% of gypsum plaster solids, between 20% and 30% of a water based phenol formaldehyde resin, between 3% and 5% of an acid hardener, between 10% and 20% of a chopped glass fibre reinforcement, and the mix also containing an antifoaming agent in an amount effective to prevent foaming of the mix and water in an amount effective to provide a workable fluid mix and to set the plaster.

2. A composition according to claim 1, wherein the mix includes between 10% and 15%, by weight of plaster solids, of a non-combustible filler in addition to the fibre reinforcement.

3. A composition according to any one of claims 1 to 2, wherein the maximum water content of the mix is up to 25% of plaster solids but not more than 15% by weight of the mix.

4. A composition according to any one of claims 1-2, wherein the mix includes a colouring agent.

5. A fibre reinforced plaster composition comprising a settable fluid mix comprising 62.10% of gypsum plaster and, by weight of plaster solids, 24.80% of a phenolic resin, 4.0% of an acid hardener, 8.75% of water, and 0.15% of a calcium carbonate agent, the mix also including over 10% to under 20% by weight of the mix of chopped glass fibre reinforcement, and an antifoaming agent in an amount effective to prevent foaming of the mix.

6. A composition according to claim 5, wherein the mix includes a colouring agent.

7. A composition according to claim 5, wherein the mix includes between 10% and 15%, by weight of plaster solids, of a non-combustible filler in addition to the fibre reinforcement.

8. A method of making an article from a reinforced plaster composition comprising; (i) a settable fluid mix containing gypsum plaster, a hardenable, water based organic resin, a hardening agent for curing the resin, a control agent for controlling the pot life and setting time of the fluid mix, an antifoaming agent in an amount effective to prevent foaming of the mix, and water in an amount effective to set the plaster, and (ii) a chopped fibre reinforcement, said method comprising:
   a. storing the fluid mix in a storage means therefor,
   b. providing a means for spraying a stream of the fluid mix from the storage means,
   c. providing a means for spraying a stream of the chopped fibre reinforcement,
   d. simultaneously spraying a stream of the fluid mix and a stream of the chopped fibre reinforcement onto a mould surface thereby forming a first-applied layer of the combined composition onto the mold surface,
   e. compacting and thereby consolidating the first-applied layer and removing entrapped gas therefrom,
   f. similarly applying and compacting successive layers of the combined composition until an article thickness is obtained, and
   g. allowing the thus produced layered composition to harden before removing the article from the mould.

9. A method according to claim 8, wherein, by weight percent of the fluid mix, the plaster is between 55% and 65%, the resin is a phenol formaldehyde resin in an amount between 20% and 30%, the hardening agent is an acid hardener in an amount between 3% and 5%, and wherein the chopped fibre reinforcement is between 10% and 20% by weight of the reinforced composition.

10. A method according to claim 9, wherein each article layer is applied by spraying a thickness from about 2 mm to about 6 mm.

11. A method according to claim 8, wherein the first-applied layer constitutes an exposed surface during use of the article and the fluid mix utilized to form the first-applied layer contains a material that will contribute to the appearance of such exposed surface, said material selected from the group of materials consisting of fillers, coloring agents and mixtures thereof.

12. A method according to claim 8, wherein the mix includes a colouring agent.

13. A method according to claim 8, wherein the mix includes between 10% and 15%, by weight of plaster solids, of a non-combustible filler in addition to the fibre reinforcement.

14. A method according to one of claims 8 and 12-13 wherein the fibre reinforcement consists of glass fibres.

15. A method according to claim 11, wherein a base layer is applied prior to said first-applied layer, said base layer formed by spraying a layer of the fluid mix without including chopped fibre reinforcement therein.

16. A fibre reinforced plaster product produced in accordance with any one of claims 8 and 12-14.

17. A product produced according to the method of any one of claims 8-11.

* * * * *